United States Patent
Gao et al.

(10) Patent No.: US 11,133,556 B2
(45) Date of Patent: Sep. 28, 2021

(54) BATTERY ACCOMMODATING DEVICE, BATTERY SYSTEM, AND METHOD FOR ACCESSING THE INTERIOR OF BATTERY SYSTEM

(71) Applicant: FORD GLOBAL TECHNOLOGIES, LLC, Dearborn, MI (US)

(72) Inventors: Fei Gao, Anhui (CN); Larry Wang, Jiangsu (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 131 days.

(21) Appl. No.: 16/685,014

(22) Filed: Nov. 15, 2019

(65) Prior Publication Data

US 2020/0365846 A1    Nov. 19, 2020

(30) Foreign Application Priority Data

May 16, 2019   (CN) .......................... 201910406059.3

(51) Int. Cl.
| | |
|---|---|
| *H01M 50/262* | (2021.01) |
| *H01M 50/204* | (2021.01) |
| *H01M 50/233* | (2021.01) |
| *H01M 50/296* | (2021.01) |
| *H01M 50/271* | (2021.01) |
| *H01M 50/249* | (2021.01) |

(Continued)

(52) U.S. Cl.
CPC ....... *H01M 50/262* (2021.01); *H01M 50/204* (2021.01); *H01M 50/233* (2021.01); *H01M 50/249* (2021.01); *H01M 50/271* (2021.01); *H01M 50/296* (2021.01); *B60K 2001/0416* (2013.01); *B60K 2001/0466* (2013.01); *B60L 50/64* (2019.02); *H01M 2220/20* (2013.01)

(58) Field of Classification Search
CPC ............. H01M 50/202; H01M 50/204; H01M 50/249; H01M 50/271; H01M 50/291; H01M 50/293; H01M 50/296; H01M 50/244; B60L 50/50; B60L 50/64; B60K 1/04; B60K 2001/0416; B60K 2001/0466
USPC ...................................................... 180/68.5
See application file for complete search history.

(56) References Cited

U.S. PATENT DOCUMENTS

| | | | |
|---|---|---|---|
| 2010/0307848 A1* | 12/2010 | Hashimoto | ............. B60L 50/64 180/68.5 |
| 2012/0164500 A1* | 6/2012 | Loo | ..................... H01M 50/325 429/82 |

(Continued)

FOREIGN PATENT DOCUMENTS

JP    2015026558 A   *   2/2015

*Primary Examiner* — Gregg Cantelmo
(74) *Attorney, Agent, or Firm* — David B. Kelley; Carlson, Gaskey & Olds

(57) ABSTRACT

This disclosure provides a battery accommodating device for a vehicle. The battery accommodating device comprises a tray, a cover, a support connecting the tray and the cover, at least one first fastener, and a plug disposed at the lower surface of the tray. The tray has a cavity for accommodating a battery assembly. The cover is disposed above the tray and used for sealing the cavity. The first fastener connects, below the cover, the support to the tray. The plug is configured to be engaged with a base on a vehicle component to connect a circuit of the battery assembly. The present disclosure also provides a battery system and a vehicle comprising a battery accommodating device.

20 Claims, 8 Drawing Sheets

(51) Int. Cl.
*B60K 1/04* (2019.01)
*B60L 50/64* (2019.01)

(56) References Cited

U.S. PATENT DOCUMENTS

| | | | |
|---|---|---|---|
| 2013/0333967 A1* | 12/2013 | Meier | B60K 1/04 180/68.5 |
| 2015/0171390 A1* | 6/2015 | Yoshioka | B60L 50/64 429/156 |
| 2015/0207130 A1* | 7/2015 | Maguire | B60L 3/0046 429/97 |
| 2016/0218335 A1* | 7/2016 | Baek | B60L 58/21 |

\* cited by examiner

BATTERY ACCOMMODATING DEVICE, BATTERY SYSTEM, AND METHOD FOR ACCESSING THE INTERIOR OF BATTERY SYSTEM

CROSS-REFERENCE TO RELATED APPLICATIONS

This disclosure claims priority to CN Patent Application No. 2019104060593, which was filed on May 16, 2019 and is incorporated herein by reference in its entirety.

TECHNICAL FIELD

This disclosure relates to a battery system for an electric vehicle, and in particular to a battery accommodating device of a high-voltage battery system for an electric vehicle.

BACKGROUND

Electric vehicles, such as Battery Electric Vehicles (BEVs), Plug-in Hybrid Electric Vehicles (PHEVs), or Hybrid Electric Vehicles (HEVs), include a traction battery system that serves as a source of energy for the vehicles. A traction battery system may include components, such as a high-voltage battery assembly, for assisting in managing vehicle performance and operation. The traction battery assembly also includes a cover that limits exposure of the high-voltage battery assembly as well as a service disconnection switch that connects or disconnects a circuit of the high-voltage battery assembly. A service disconnection switch of a conventional battery system is disposed on a side surface of a battery system housing or inside the battery system, limiting the space for accommodating a high-voltage battery assembly.

SUMMARY

For at least one of the above problems, the present disclosure provides a battery accommodating device which can provide an increased accommodating space for a battery assembly and which causes the battery system to be forcibly switched off during maintenance.

According to one aspect of the present disclosure, a battery accommodating device for a vehicle is provided. The battery accommodating device includes a tray, a cover, a support connecting the tray and the cover, at least one first fastener, and a plug disposed at the lower surface of the tray. The tray has a cavity for accommodating a battery assembly. The cover is disposed above the tray and used for sealing the cavity. The first fastener connects, below the cover, the support to the tray. The plug is configured to be engaged with a base on a vehicle component to connect a circuit of the battery assembly.

In some embodiments, the position of the support on the tray and the cover and the manner in which the support is connected to the first fastener allow the cover to be opened only after removal of the battery accommodating device from the vehicle.

In some embodiments, the tray has a flange extending outward from an upper portion of the tray, and the cover completely covers the flange. The support has a first portion located at the lower surface of the flange, a second portion located at the upper surface of the cover, and an intermediate portion connecting the first portion and the second portion. The main plane of the first portion is parallel to the main plane of the second portion and perpendicular to the main plane of the intermediate portion.

In some embodiments, the battery accommodating device further includes two second fasteners disposed separately, and the second portion is secured to the upper surface of the cover by the two second fasteners. The at least one first fastener includes two first fasteners disposed separately, the first portion is secured to the lower surface of the flange by the two first fasteners, and the two first fasteners are fastened or released only by a tool operating below the tray.

In some embodiments, the yield strength of the support is in a range of 235 MPa to 345 MPa. The thickness of the support is in a range of 1.2 mm to 2.0 mm. In some embodiments, the support has an insulation layer, and the thickness of the insulation layer is in a range of 20 μm to 50 μm.

In some embodiments, the first portion of the support has a first through hole and a second through hole that match the two first fasteners, the second portion has a third through hole and a fourth through hole that match the two second fasteners, and a plane in which the first through hole and the second through hole are located is parallel to a plane in which the third through hole and the fourth through hole are located. A first distance between the first through hole and the second through hole of the first portion of the support is shorter than a second distance between the third through hole and the fourth through hole of the second portion of the support. The first distance is in a range of 70 mm to 120 mm and the second distance is in a range of 140 mm to 240 mm. In some embodiments, the first through hole and the second through hole are both circular holes and have the same diameter; the third through hole is a circular hole, the fourth through hole is an elliptical hole, and the diameter of the fourth through hole is larger than the diameter of the third through hole.

In some embodiments, the battery accommodating device further includes a third fastener, and the third fastener connects the cover and the tray and is located below the second portion of the support.

According to another aspect of the present disclosure, a battery system for a vehicle is provided. The battery system includes a tray having a cavity, a cover disposed above the tray and for sealing the cavity, a battery assembly disposed in the cavity, a support connecting the tray and the cover, and a service disconnection switch connected to the battery assembly via a circuit. The service disconnection switch includes a plug disposed at the lower surface of the tray and a base disposed on a vehicle component. The support is connected to the tray by at least one first fastener, the first fastener can be released by a tool operating from the lower surface of the tray only when the tray and the cover are removed from the vehicle. The service disconnection switch is configured so that, when the tray is located in the vehicle component, the plug is engaged with the base to connect the circuit; and when the tray is removed from the vehicle component, the plug is disengaged from the base to disconnect the circuit.

In some embodiments, the vehicle component is an accommodating part between a trunk floor and a vehicle floor, and the base is disposed at the bottom surface of the accommodating part. In some embodiments, the distance between a side surface of the tray or the cover and a side wall of the accommodating part is in a range of 10 mm to 25 mm.

In some embodiments, the tray has a flange extending outward from an upper portion of the tray, and the cover completely covers the flange. The support has a first portion located at the lower surface of the flange, a second portion located at the upper surface of the cover, and an intermediate portion connecting the first portion and the second portion. The main plane of the first portion is parallel to the main plane of the second portion and perpendicular to the main plane of the intermediate portion.

In some embodiments, the battery system further includes two second fasteners disposed separately, and the second portion is secured to the upper surface of the cover by the two second fasteners. The at least one first fastener includes two first fasteners disposed separately, and the first portion is secured to the lower surface of the flange by the two first fasteners. The first portion of the support has a first through hole and a second through hole that match the first fastener, and the second portion of the support has a third through hole and a fourth through hole that match the second fastener. A plane in which the first through hole and the second through hole are located is parallel to a plane in which the third through hole and the fourth through hole are located.

In some embodiments, a first distance between the first through hole and the second through hole is shorter than a second distance between the third through hole and the fourth through hole. The first distance is in a range of 70 mm to 120 mm and the second distance is in a range of 140 mm to 240 mm.

According to another aspect of the present disclosure, a vehicle is provided. The vehicle includes a vehicle component located at the bottom of the vehicle, a tray located on the vehicle component and having a cavity, a cover disposed above the tray and for sealing the cavity, a battery assembly disposed in the cavity, a support connecting the tray and the cover, and a service disconnection switch connected to the battery assembly via a circuit. The support has a U-shaped cross-section to cover an edge portion of the tray and an edge portion of the cover, the support is connected to the tray by at least one first fastener, and the first fastener is fastened or released by a tool operating below the tray when the tray and the cover are removed from the vehicle component. The service disconnection switch includes a plug disposed at the lower surface of the tray and a base disposed in the vehicle component. When the tray is located in the vehicle component, the plug is engaged with the base to connect the circuit; when the tray is removed from the vehicle component, the plug is disengaged from the base to disconnect the circuit.

In some embodiments, the support is spaced apart from a side wall of the vehicle component so that the tool is not operable to fasten or release the first fastener when the tray and the cover are located in the vehicle component.

It should be understood that the foregoing brief description is provided to introduce, in a simplified form, a concept of a series of selections to be further described in the detailed description, which is not intended to confirm the key or essential features of the subject matter of the present disclosure, and the scope of the present disclosure is to be defined solely by the claims of the present disclosure. Further, the claimed subject matter is not limited to embodiments that overcome any of the disadvantages described above or in any part of this specification.

BRIEF DESCRIPTION OF THE DRAWINGS

One or a plurality of features and/or advantages of the present disclosure will become apparent from the following detailed description of one or a plurality of embodiments in conjunction with the accompanying drawings.

DETAILED DESCRIPTION

Figure 1A:
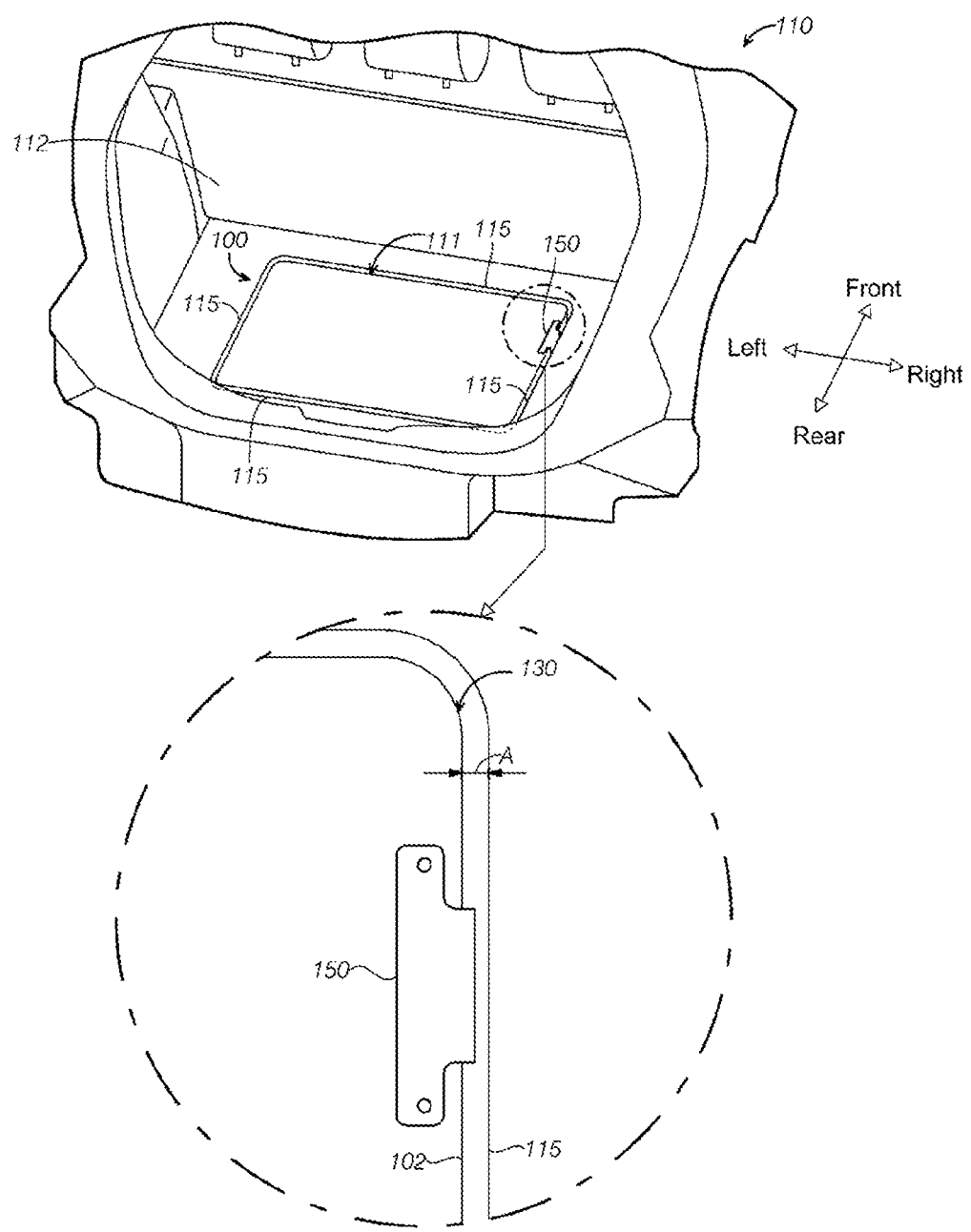
FIG. 1A is a schematic view of a portion of a vehicle including a battery system, including a schematic enlarged view of the position of a support, showing the position of the battery system in the vehicle according to an embodiment of the present disclosure.

Specific embodiments of the present disclosure are disclosed in the specification of the present disclosure as needed; however, it should be understood that the embodiments disclosed herein are merely examples of the present disclosure that can be implemented in a plurality of alternative forms. The drawings are not necessarily drawn to scale; some features can be enlarged or reduced to show details of a particular component. The same or similar reference numerals may indicate the same parameters and components or similar modifications and substitutions. In the following description, a plurality of operating parameters and components are described in the contemplated embodiments. These specific parameters and components are given by way of example only and are not meant to be limiting in this specification. Therefore, the specific structural and functional details disclosed in the specification should not be construed as limiting, but merely as a representative basis for teaching those skilled in the art to implement the present disclosure in a plurality of forms.

A battery system for an electric vehicle is provided with a service disconnection switch to disconnect a high-voltage circuit, thereby providing protection for users or maintenance personnel who may contact the battery system. The battery system of most electric vehicles is located below the trunk of the vehicle and has a limited accommodating space. The service disconnection switch of a conventional battery system is provided on a side surface of or inside a battery housing, thereby occupying a portion of the accommodating space, and therefore further limiting the volume for accommodating a battery assembly. In view of the above, in the following embodiments, a battery system which has a larger battery assembly accommodating space and which causes the battery system to be forcibly switched off during maintenance is disclosed.

Figure 1B:
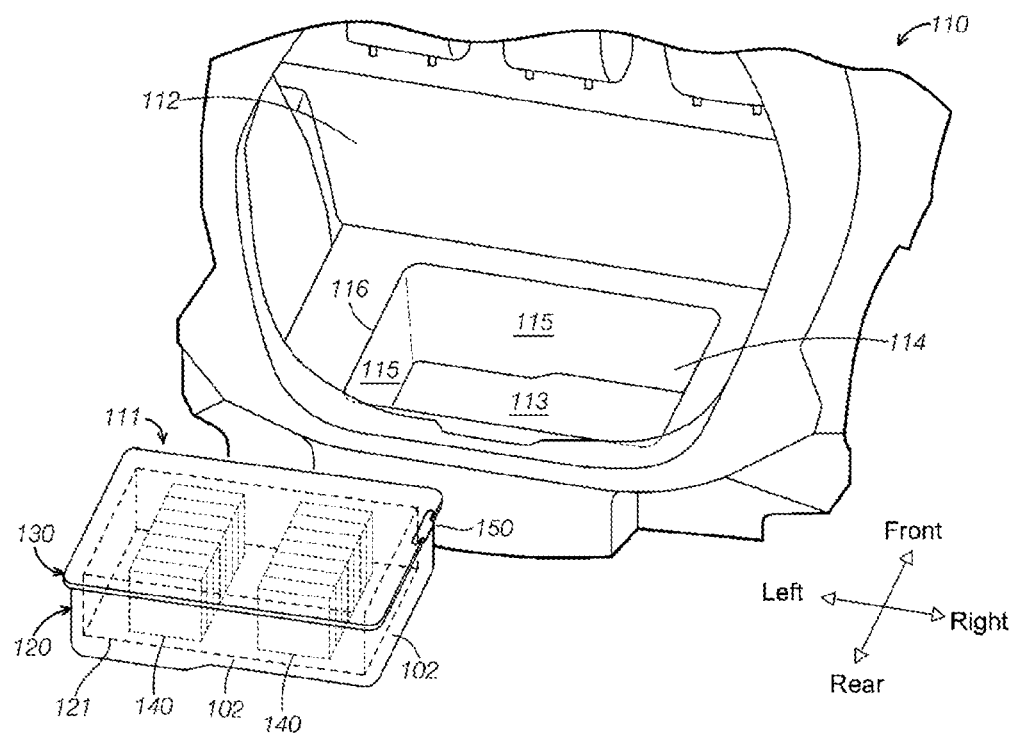
FIG. 1B is a schematic view of a portion of a vehicle when the battery accommodating device of FIG. 1 is removed.

FIG. 1A is a schematic view of a rear portion of a vehicle 110 including a battery system 100, showing the interior of the trunk of the vehicle, and FIG. 1A further includes a schematic enlarged view of the position of the support. FIG. 1B is a schematic view of the rear portion of the vehicle after a battery accommodating device 111 of the battery system 100 of FIG. 1A is removed. As shown in FIGS. 1A and 1B, the battery accommodating device 111 of the battery system 100 is mounted in an accommodating part 114 below the trunk 112 of the vehicle 110. The accommodating part 114 is an accommodating space defined by a rear portion of a vehicle body 116, located below the trunk 112 and generally covered by a trunk mat (not shown). The accommodating part 114 has a bottom surface 113 and four side walls 115 that define a space that can be used to accommodate the battery accommodating device 111. The distance A between the four side walls 115 of the accommodating part 114 and four side walls 102 of the battery accommodating device 111 is small and can be in a range of about 10 mm to about 25 mm, in an example, or in a range of about 15 mm to about 20 mm, in another example. In this way, the battery accommodating device 111 can occupy as much space as possible in the accommodating part 114, and can provide more space for accommodating more battery cells.

Referring to FIG. 1B, the battery accommodating device 111 includes a tray 120 and a cover 130. The tray 120 has a cavity 121 for accommodating a battery assembly 140, and the cover 130 is disposed above the tray 120 and seals the cavity 121. The battery accommodating device 111 also has a support 150 connecting the tray 120 and the cover 130. As shown in FIGS. 1A and 1B, the support 150 may be adjacent to a right side wall of the accommodating part 114 to connect a right side of the cover 130 and a right side of the tray 120. It should be understood that the support 150 may be disposed in any other suitable position in the battery system 100. In some embodiments, the support 150 is adjacent to a front side wall of the accommodating part 114 and connects a front side of the cover 130 to a front side of the tray 120. In some embodiments, the support 150 is adjacent to a left side wall of the accommodating part 114 and connects a left side of the cover 130 to a left side of the tray 120. In some embodiments, the support 150 is adjacent to a rear side wall of the accommodating part 114 and connects a rear side of the cover 130 to a rear side of the tray 120.

The support 150 may be located in a position of the battery accommodating device 111 that is relatively away from the rear portion of the vehicle. For example, the support 150 may be located in a front portion of the battery accommodating device 111, that is, adjacent to the front side wall of the accommodating part 114. The support 150 may also be located in the left or right side of the battery accommodating device 111 and in a position relatively away from the rear portion of the vehicle, as shown in FIG. 1A. In this way, the support 150 is in a position as far away from the position accessible to the user or maintenance personnel as possible, which reduces the likelihood that the support 150 will be contacted or forcibly removed when the battery accommodating device 111 is located in the accommodating part 114.

In some embodiments, the battery system 100 may include a plurality of supports 150, and the plurality of supports 150 may be uniformly disposed on opposite sides of the battery accommodating device 111, such as the left and right sides, or the front and rear portions. The plurality of supports 150 may also be disposed along one side edge of the battery accommodating device 111, or on two adjacent side edges, three side edges, or all four side edges of the battery accommodating device 111.

Figure 2:
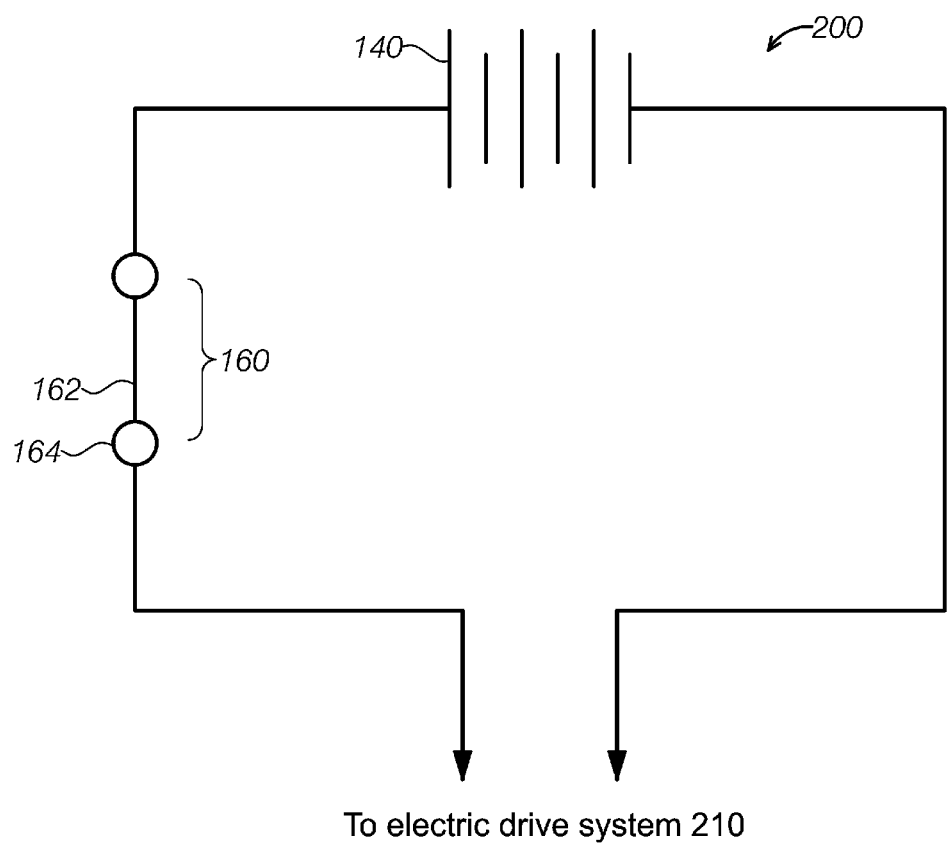
FIG. 2 is a schematic view of a circuit of a service disconnection switch of a battery system, with the service disconnection switch in a switched-on state.

The battery system 100 further includes a service disconnection switch 160. FIG. 2 is a schematic view of a circuit 200 having the service disconnection switch 160. The service disconnection switch 160 is electrically connected in the circuit 200 having the battery assembly 140 and an electric drive system 210. When the service disconnection switch 160 is switched on (as shown in FIG. 2), the battery assembly 140 (e.g., a high-voltage battery, which may include a plurality of battery cells) provides power for the electric drive system 210. When the service disconnection switch 160 is switched off, the circuit 200 forms an open circuit, and the battery assembly 140 is unable to provide power for the electric drive system 210.

Figure 3:
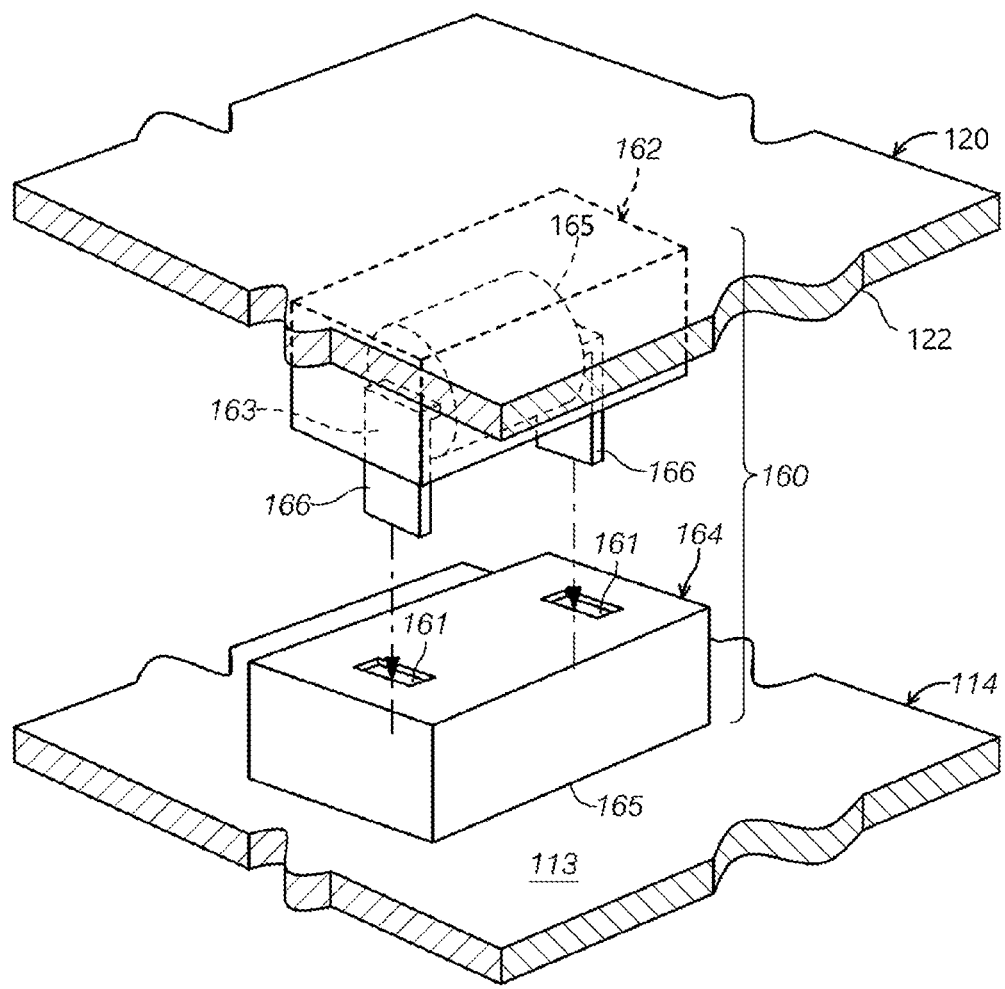
FIG. 3 is a schematic perspective view of a service disconnection switch of a battery system, in which the service disconnection switch connected to a battery accommodating device and a vehicle component is in a switched-off state.
Figure 4:
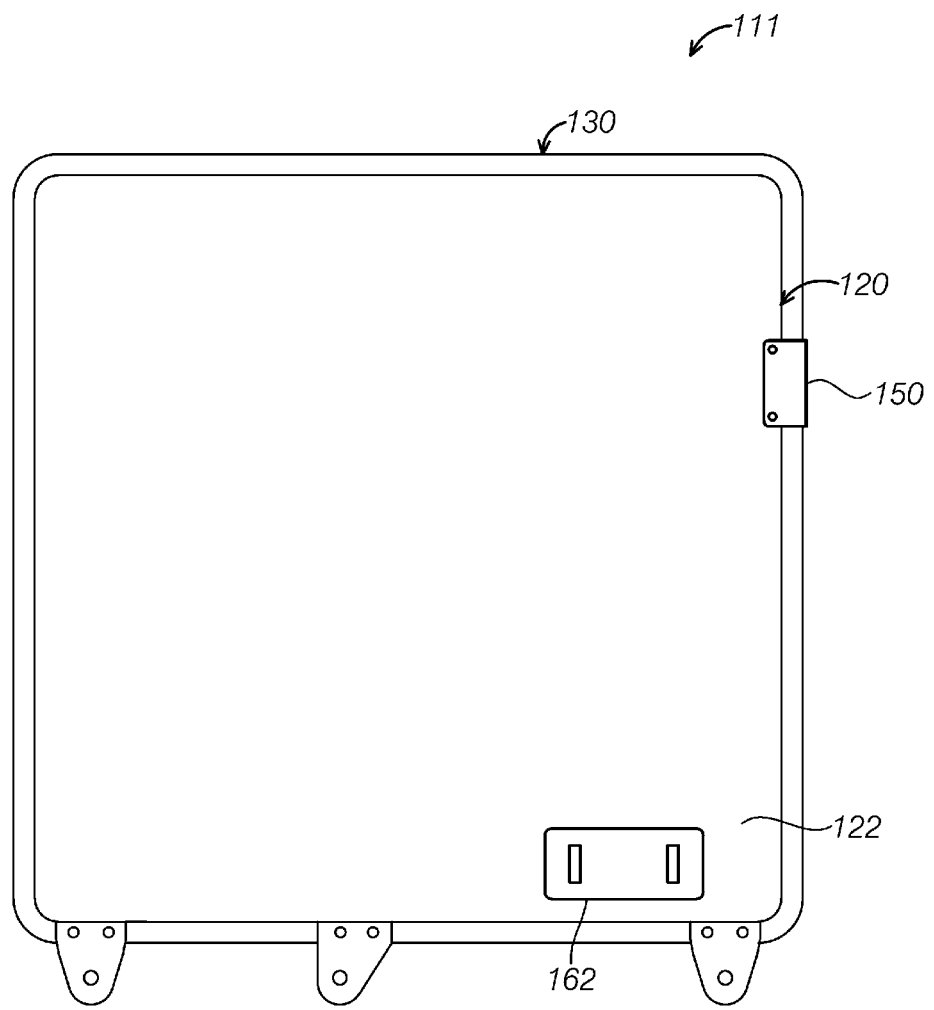
FIG. 4 is a bottom view of a battery accommodating device of a battery system.

FIG. 3 is a perspective view of the service disconnection switch 160. As shown in FIG. 3, the service disconnection switch 160 includes a plug 162 and a base 164. FIG. 4 is a bottom plan view of the battery system 100, showing the position of the plug 162. The plug 162 is disposed at the lower surface 122 of the tray 120, and the base 164 is disposed at the bottom surface 113 of the accommodating part 114.

The base 164 is connected to the accommodating part 114. The upper portion of the base 164 facing the plug 162 includes at least two female jacks 161, and the female jacks 161 accommodate at least a portion of the plug 162 therein. The female jacks 161 are made from a conductive material and are electrically connected to the circuit 200. The base 164 may be made from a non-conductive material (such as plastic), and the bottom 165 may be attached to the bottom surface 113 of the accommodating part 114.

The plug 162 includes a conductive member 163, and the conductive member 163 may be formed by metal (such as copper or aluminum), and is partially accommodated in the plug 162. The conductive member 163 may include a fuse 165 and two tabs 166 protruding outwardly from the plug 162 and extending away therefrom, the tabs 166 facing and aligned with the female jacks 161. When the plug 162 is engaged with the base 164, the tabs 166 are accommodated in the female jacks 161 to close the circuit 200, as shown in FIG. 2.

When the tray 162 is spaced a certain distance from the accommodating part 114, the base 164 is disengaged from the plug 162, so that the service disconnection switch 160 is switched off, as shown in FIG. 3, so that the battery assembly 140 is disconnected from the circuit 200 of the electric drive system 210, and therefore the battery assembly 140 is unable to provide power for the electric drive system 210.

It should be understood that in some embodiments, the positions of the base 164 and the plug 162 of the service disconnection switch 160 are interchangeable, that is, the plug 162 is disposed at the bottom surface 113 of the accommodating part 114 and the base 164 is disposed at the lower surface 122 of the tray 120.

Figure 5:
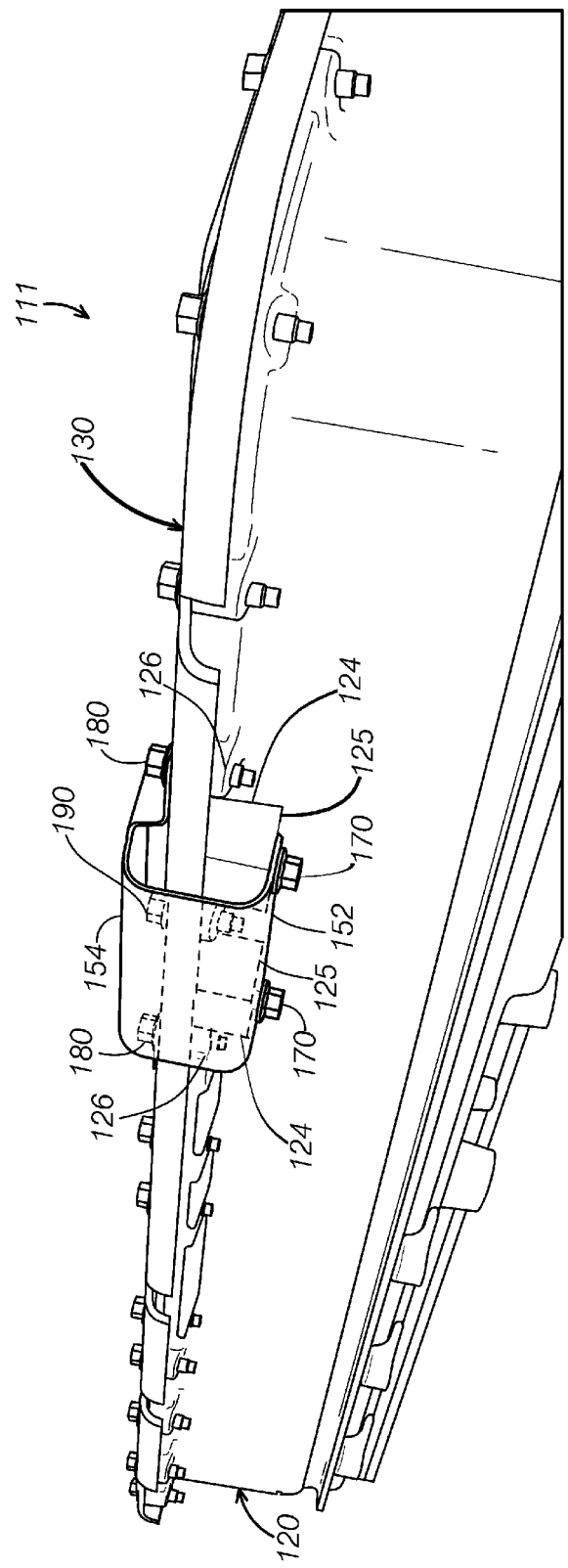
FIG. 5 is a schematic enlarged view of a portion of the battery accommodating device of FIG. 4.
Figure 6:
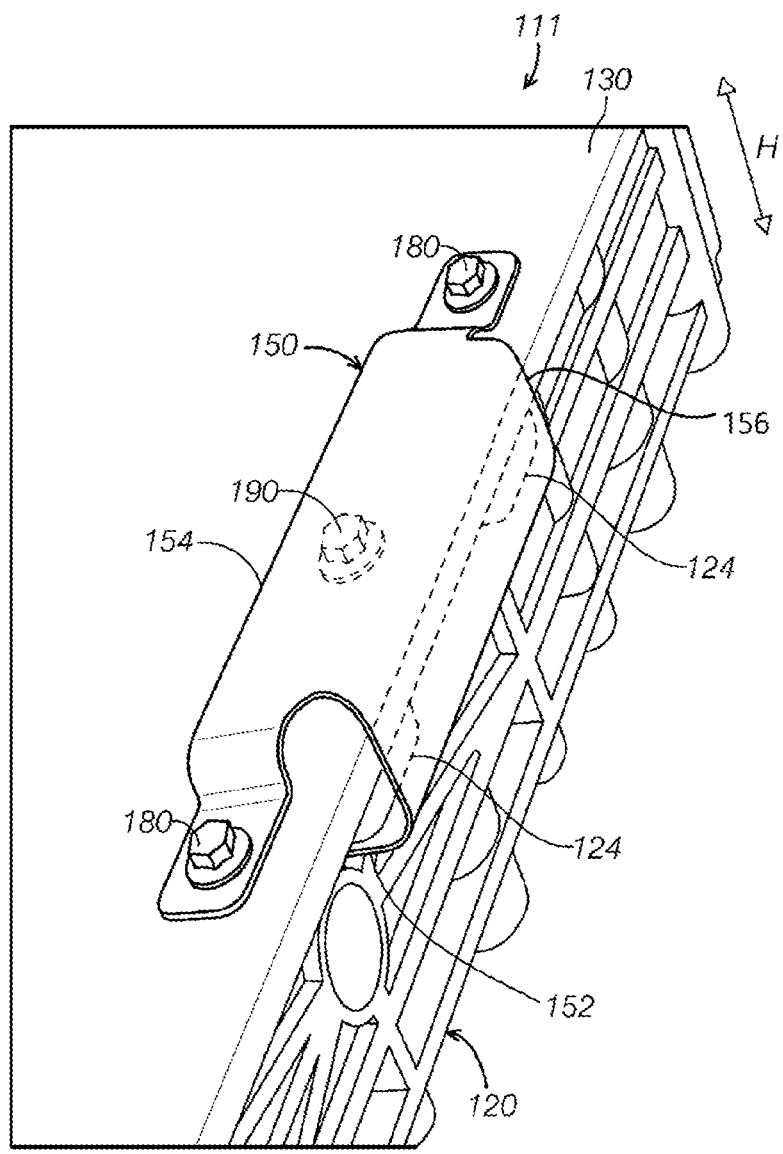
FIG. 6 is a schematic enlarged view of another portion of the battery accommodating device of FIG. 4.
Figure 7:
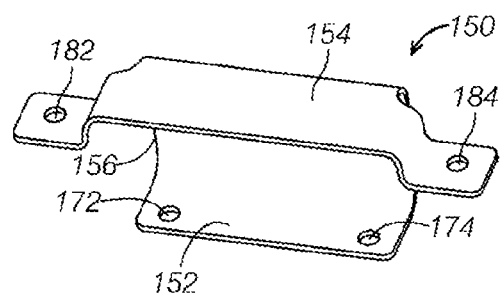
FIG. 7 is a perspective view of a support.

FIGS. 5 and 6 show the position of the support 150 on the tray 120 and on the cover 130, respectively, and FIG. 7 is a perspective view of the support 150. Please refer to FIGS. 5-7. The support 150 has a first portion 152 and a second portion 154 spaced apart from each other in the height direction H, and an intermediate portion 156 connecting the first portion 152 and the second portion 154.

The tray 120 may include a first flange 124 extending outward from an upper portion of the tray 120, and the cover 130 completely covers the first flange 124, so that the first flange 124 or the tray 120 is invisible when the battery accommodating device 111 is viewed from the top. As shown in FIG. 5, the first portion 152 can be secured to the lower surface 125 of the first flange 124 of the tray 120 by the first fastener 170. In the illustrated embodiment, the first fastener 170 may include a stud, and the stud passes through the first portion 152 of the support 150, and is engaged with a threaded hole in the first flange 124 of the tray 120 to secure the first portion 152 below the tray 120. In the illustrated embodiment, the battery system 100 includes two first fasteners 170.

Figure 10:
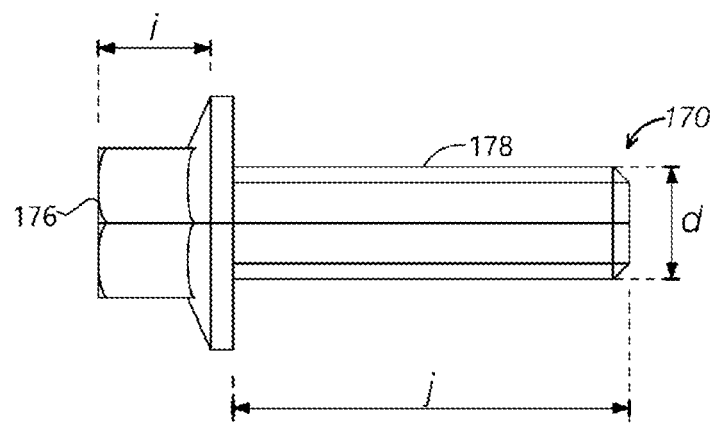
FIG. 10 is a schematic view of a first fastener.

The main plane of the second portion 154 of the support 150 may be parallel to the main plane of the first portion 152, and the second portion 154 can be secured to the upper surface 132 of the cover 130 by a second fastener 180. As shown in FIG. 5, the tray 120 may include a second flange 126 extending outward from the upper portion of the tray 120, and the cover 130 completely covers the second flange 126, so that the second flange 126 or the tray 120 is invisible when the battery accommodating device 111 is viewed from the top. As shown in FIGS. 6 and 10, the second fastener 180 may include a stud, and the stud passes through the second portion 154 and the cover 130, and is engaged with a threaded hole in the second flange 126 of the tray 120 to secure the second portion 154 above the cover 130 and connect the cover 130, the tray 120, and the support 150. In the illustrated embodiment, the battery system 100 includes two second fasteners 180.

Figure 9:
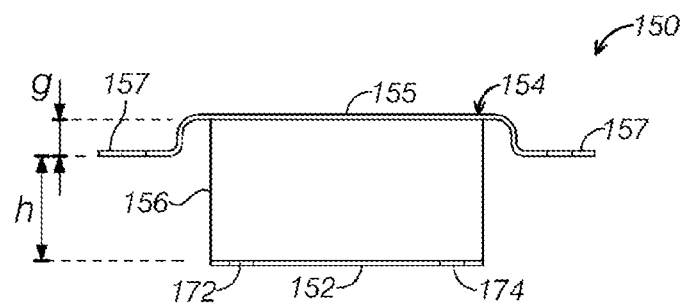
FIG. 9 is a side view of a support.

Referring to FIGS. 6 and 9, in some embodiments an intermediate segment 155 of the second portion 154 of the support 150 may project upward for a predetermined distance, the battery system 100 further includes a third fastener 190, and a portion (e.g., a head) of the third fastener 190 is accommodated in a space between the intermediate segment 155 and the upper surface 132 of the cover 130. The third fastener 190 is located below the intermediate segment 155 and connects the cover 130 and the tray 120, and the third fastener 190 is invisible and cannot be removed without the removal of the support 150 because the third fastener 190 is completely covered by the second portion 154 (the intermediate segment 155) of the support 150.

The main plane of the intermediate portion 156 of the support 150 may be perpendicular to the main plane of the first portion 152 or the second portion 154. The second portion 154 may be fitted to or spaced a small distance from a side surface of the tray 120 or the cover 130. As such, the accommodating part 114 can provide as much space as possible for accommodating the battery assembly 140.

Referring now to each of the above embodiments, the support 150 and the battery system 100 may have four fixation points (i.e., the positions of the two first fasteners 170 and the two second fasteners 180), wherein two fixation points are arranged such that the two second fasteners 180 are inserted from above the cover 130, defined herein as the second fasteners 180 located above the tray 120, and the other two fixation points are arranged such that the first fasteners 170 are inserted from below the tray 120, defined herein as the first fasteners 170 located below the tray 120. The distance A between the four side walls 115 of the accommodating part 114 and the four side walls 102 of the battery system 100 is so small that a user or maintenance personnel cannot access the two first fasteners 170 below the tray 120 or release the first fasteners 170 by a tool operating below the tray 120 without removing the battery accommodating device 111 from the accommodating part 114. In addition, if a user or maintenance personnel want to open the cover 130 to access the interior of the battery system 100, the support 150 must be removed, that is, all above fasteners connected to the support must first be removed.

This means that if a user or maintenance personnel want to access the interior of the battery system 100, the battery system 100 must be removed from the accommodating part 114 to expose the two first fasteners 170 below the tray 120 so that the user or maintenance personnel are provided with a sufficient operating space to remove the two first fasteners 170 below the tray 120. In some embodiments, a hoist can be used to remove the battery accommodating device 111 from the accommodating part 114 and lift the same up such that a user or maintenance personnel can operate below the battery accommodating device 111 to remove the two first fasteners 170. The second fasteners 180 can be removed before or after removal of the first fasteners 170. Then, the support 150 can be removed and the cover 130 can be opened to access the interior of the battery system 100.

In this way, the lower surface 122 of the tray 120 is removed from the accommodating part 114, the service disconnection switch 160 is switched off, and the circuit 200 of the high-voltage battery assembly 140 forms an open circuit. In other words, the operation of opening the cover 130 requires removal of the support 150, and the removal of the support 150 forces removal of the battery accommodating device 111 from the accommodating part 114. During the removal, the service disconnection switch 160 is automatically switched off. Thus, the risk that the battery system 100 is live can be reduced during maintenance of the battery system 100 and battery replacement.

In the embodiment including the third fastener 190, removal of the third fastener 190 is further required after the removal of the support 150, and then the cover 130 is allowed to be opened. The third fastener 190 is positioned such that the third fastener 190 must be removed after the removal of the support 150, and the removal of the support 150 requires the removal of the battery accommodating device 111 from the accommodating part 114 to disconnect the circuit, further reducing the likelihood that the battery accommodating device is live.

In some embodiments, the yield strength of the support 150 is in a range of 235 MPa to 345 MPa. In this way, the support 150 is not prone to deform, so that the possibility that the support 150 is damaged during mounting is reduced, and the possibility that the user or the maintenance personnel take advantage of the deformation of the support 150 to open the cover 130 without removing the battery accommodating device 111 is also reduced.

In some embodiments, the thickness of the support 150 is in a range of about 1.2 mm to about 2.0 mm.

In some embodiments, the surface of the support 150 may have an insulation layer. The insulation layer may be coated to the surface of the support 150 by means of electrophoresis or the like, and the thickness of the insulation layer may be in a range of about 20 μm to about 50 μm.

Figure 8:
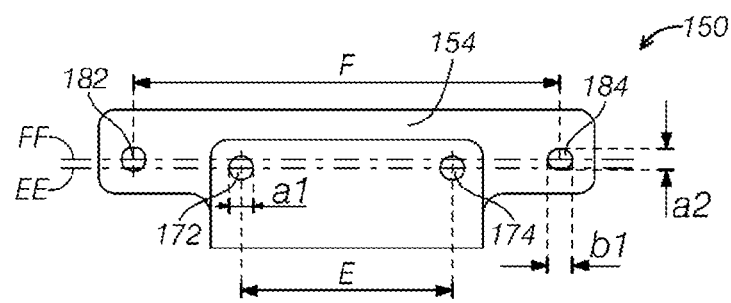
FIG. 8 is a bottom view of a support.

FIG. 7 is a perspective view of the support 150, FIG. 8 is a bottom view of the support 150, and FIG. 9 is a side view of the support 150. Referring first to FIGS. 7 and 8, the first portion 152 of the support 150 has through holes corresponding to the two first fasteners 170, i.e., a first through hole 172 and a second through hole 174. The first through hole 172 and the second through hole 174 may be the same, for example, both of which are circular holes, the diameter a1 of which matches the diameter d of the shank of the first fastener 170. For example, d may be slightly greater than a1, the difference between d and a1 is t1, and t1 is in a range of about 0.25 mm to about 0.75 mm.

The second portion 154 may have two through holes corresponding to the second fasteners 180, i.e., a third through hole 182 and a fourth through hole 184. In some embodiments, the third through hole 182 and the fourth through hole 184 may be different. For example, the third through hole 182 is a circular hole being the same as the first through hole 172 and the second through hole 174, but the fourth through hole 184 is an elliptical hole or elongated hole larger than the third through hole 182: the diameter a2 of the fourth through hole 184 in a first direction is the same as a1 the diameter 131 of the fourth through hole 184 in a second direction perpendicular to the first direction may be greater than a2; the difference between 131 and a2 is t2; and t2 is in a range of about 1 mm to about 2 mm. In such an embodiment, the fourth through hole 184 has the size different than that of the third through hole 182, the first through hole 172, and the second through hole 174, and a certain tolerance is allowed so as to facilitate the mounting of the support.

It should be understood that in some embodiments, the third through hole 182 and the fourth through hole 184 may be the same; for example, both may be circular holes.

Referring now to FIG. 8, the connecting line EE passing through the center of the first through hole 172 and the center of the second through hole 174 may be parallel to the connecting line FF passing through the center of the third through hole 182 and the center of the fourth through hole 184. The distance E between the first through hole 172 and the second through hole 174 may be shorter than the distance F between the third through hole 182 and the fourth through hole 184. In some embodiments, the distance E is in a range of about 70 mm to about 120 mm and the distance F is in a range of about 140 mm to about 240 mm. In some embodiments, the plane in which the first through hole 172 and the second through hole 174 are located may be parallel to the plane in which the third through hole 182 and the fourth through hole 184 are located.

In some embodiments, the flatness Z of the first portion 152 is in a range of about 0.2 mm to about 0.4 mm, and the flatness Y of a side segment 157 of the second portion 154 contacting the cover 130 is in a range of about 0.2 mm to about 0.4 mm. In this way, the interference in the mounting can be reduced, thereby facilitating the mounting of the support.

FIG. 10 is a schematic view of the first fastener 170. The first fastener 170 includes a head 176 and a shank 178. The shank 178 includes a thread, and is engaged with a corresponding threaded hole in the first flange 124 of the tray 120 to connect the support 150 and the tray 120. Referring now to FIGS. 8 and 9, the distance h between the side segment 157 of the second portion 154 and the first portion 152 may be greater than the length j of the shank 178 of the first fastener 170, and the difference between the distance h and the shank length j may be in a range of about 10 mm to about 15 mm. The second fastener 180 and the third fastener 190 may have the structure and size being the same as or similar to those of the first fastener 170 of FIG. 10. The distance g between the side segment 157 and the intermediate segment 155 of the second portion 154 may be greater than the length i of a head of the second fastener 180, the length of the head of the second fastener 180 may be equal to the length i of the head of the first fastener 170 in FIG. 10, and the difference between the distance g and the length i may be in a range of 5 mm to 10 mm. In this way, the interference in the mounting can be reduced, thereby facilitating the mounting of the support.

The battery system and the battery accommodating device according to the embodiments of the present disclosure are capable of providing an increased accommodating space for the battery assembly, and can also force a user or maintenance personnel to switch off the service disconnection switch when accessing the interior of the battery system, so that the battery system is free of high-voltage electricity.

It should be understood that the structures and procedures disclosed in the specification of the present disclosure are exemplary in themselves and that the specific embodiments should not be construed as limiting, as there may be a plurality of variations.

The above descriptions are only exemplary embodiments and are not intended to limit the present disclosure, which may be subject to various modifications and variations by those skilled in the art. Any modifications, equivalent replacements, improvements, etc. made within the spirit and principles of the present disclosure shall fall within the protection scope of the present disclosure.

What is claimed is:

1. A battery accommodating device for a vehicle, comprising:
 a tray including a cavity for accommodating a battery assembly;
 a cover disposed above the tray and configured for sealing the cavity;
 a support connecting the tray and the cover;
 at least one first fastener,
 wherein the at least one first fastener connects the support to the tray at a location below the cover; and
 a plug disposed at a lower surface of the tray,
 wherein the plug is configured to be engaged with a base on a vehicle component to connect a circuit of the battery assembly.

2. The battery accommodating device according to claim 1, wherein the cover and the support are removable from the tray only after removal of the battery accommodating device from the vehicle.

3. The battery accommodating device according to claim 1, wherein the tray has a flange extending outward from an upper portion of the tray, and the cover completely covers the flange; the support has a first portion located at a lower surface of the flange, a second portion located at an upper surface of the cover, and an intermediate portion connecting the first portion and the second portion.

4. The battery accommodating device according to claim 3, wherein a main plane of the first portion is parallel to a main plane of the second portion and perpendicular to a main plane of the intermediate portion.

5. The battery accommodating device according to claim 3, further comprising two second fasteners disposed separately, wherein the second portion is secured to the upper surface of the cover by the second fastener; and wherein the at least one first fastener comprises two first fasteners disposed separately, the first portion is secured to the lower surface of the flange by the two first fasteners, and the two first fasteners are fastened or released only by a tool operating below the tray.

6. The battery accommodating device according to claim 1, wherein a yield strength of the support is in a range of 235 MPa to 345 MPa.

7. The battery accommodating device according to claim 1, wherein a thickness of the support is in a range of 1.2 mm to 2.0 mm.

8. The battery accommodating device according to claim 1, wherein the support has an insulation layer, and a thickness of the insulation layer is in a range of 20 μm to 50 μm.

9. The battery accommodating device according to claim 5, wherein the first portion of the support has a first through hole and a second through hole that match the two first fasteners, the second portion has a third through hole and a fourth through hole that match the two second fasteners, and a plane in which the first through hole and the second through hole are located is parallel to a plane in which the third through hole and the fourth through hole are located.

10. The battery accommodating device according to claim 9, wherein a first distance between the first through hole and the second through hole of the first portion of the support is shorter than a second distance between the third through hole and the fourth through hole of the second portion of the support; the first distance is in a range of 70 mm to 120 mm and the second distance is in a range of 140 mm to 240 mm.

11. The battery accommodating device according to claim 9, wherein the first through hole and the second through hole are both circular holes and have the same diameter; the third through hole is a circular hole, the fourth through hole is an elliptical hole, and the diameter of the fourth through hole is larger than the diameter of the third through hole.

12. The battery accommodating device according to claim 11, further comprising a third fastener, wherein the third fastener connects the cover and the tray and is located below the second portion of the support.

13. A battery system for a vehicle, comprising:
a tray having a cavity;
a cover disposed above the tray and configured for sealing the cavity;
a battery assembly disposed in the cavity;
a support connecting the tray and the cover; and
a service disconnection switch connected to the battery assembly via a circuit,
wherein the service disconnection switch comprises a plug disposed at a lower surface of the tray and a base disposed on a vehicle component,
wherein the support is connected to the tray by at least one first fastener, the at least one first fastener accessible only from the lower surface of the tray and only when the tray and the cover are removed from the vehicle, and
the service disconnection switch is configured so that, when the tray is located in the vehicle component, the plug is engaged with the base to connect the circuit, and when the tray is removed from the vehicle component, the plug is disengaged from the base to disconnect the circuit.

14. The battery system according to claim 13, wherein the vehicle component is an accommodating part located between a trunk floor and a vehicle floor, and the base of the service disconnection switch is disposed at a bottom surface of the accommodating part.

15. The battery system according to claim 14, wherein a distance between a side surface of the tray or the cover and a side wall of the accommodating part is in a range of 10 mm to 25 mm.

16. The battery system according to claim 13, wherein the tray has a flange extending outward from an upper portion of the tray, and the cover completely covers the flange; the support has a first portion located at the lower surface of the flange, a second portion located at an upper surface of the cover, and an intermediate portion connecting the first portion and the second portion; a main plane of the first portion is parallel to a main plane of the second portion and perpendicular to a main plane of the intermediate portion.

17. The battery system according to claim 16, further comprising two second fasteners disposed separately, wherein the second portion is secured to the upper surface of the cover by the two second fasteners; and wherein the at least one first fastener comprises two first fasteners disposed separately, and the first portion is secured to the lower surface of the flange by the two first fasteners; the first portion of the support has a first through hole and a second through hole that match the first fasteners, the second portion of the support has a third through hole and a fourth through hole that match the second fasteners, and a plane in which the first through hole and the second through hole are located is parallel to a plane in which the third through hole and the fourth through hole are located.

18. The battery system according to claim 17, wherein a first distance between the first through hole and the second through hole is shorter than a second distance between the third through hole and the fourth through hole; the first distance is in a range of 70 mm to 120 mm and the second distance is in a range of 140 mm to 240 mm.

19. A vehicle, comprising:
a vehicle component located at a bottom of the vehicle;
a tray located on the vehicle component and having a cavity;
a cover disposed above the tray and for sealing the cavity;
a battery assembly disposed in the cavity;
a support connecting the tray and the cover,
wherein the support has a U-shaped cross section to cover an edge portion of the tray and an edge portion of the cover; and
a service disconnection switch connected to the battery assembly via a circuit,
wherein the service disconnection switch comprises a plug disposed at a lower surface of the tray and a base disposed in the vehicle component,
wherein the support is connected to the tray by at least one first fastener,
wherein, when the tray is located in the vehicle component, the plug is engaged with the base to connect the circuit,
wherein, when the tray is removed from the vehicle component, the plug is disengaged from the base to disconnect the circuit.

20. The vehicle according to claim 19, wherein the support is spaced apart from a side wall of the vehicle component so that the at least one first fastener is not accessible when the tray and the cover are located in the vehicle component.

* * * * *